United States Patent
Nakagawa et al.

(10) Patent No.: US 8,935,537 B2
(45) Date of Patent: *Jan. 13, 2015

(54) STORAGE DEVICE AND ITS CONTROL METHOD

(71) Applicant: Hitachi, Ltd., Tokyo (JP)

(72) Inventors: Hirotaka Nakagawa, Sagamihara (JP); Masayasu Asano, Yokohama (JP); Takeki Okamoto, Odawara (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 13/711,725

(22) Filed: Dec. 12, 2012

(65) Prior Publication Data

US 2013/0124873 A1    May 16, 2013

Related U.S. Application Data

(63) Continuation of application No. 12/527,160, filed as application No. PCT/JP2009/059920 on May 25, 2009, now Pat. No. 8,341,425.

(51) Int. Cl.
*G06F 21/00* (2013.01)
*G06F 12/14* (2006.01)
(Continued)

(52) U.S. Cl.
CPC ........ *G06F 12/1408* (2013.01); *G06F 11/0727* (2013.01); *H04L 69/40* (2013.01);
(Continued)

(58) Field of Classification Search
CPC . G06F 11/0793; G06F 11/14; G06F 11/1402; G06F 11/1446–11/1469; G06F 11/16; G06F 21/78; G06F 21/79; G06F 21/80; G06F 21/805; G06F 3/0614; G06F 3/17; G06F 3/19; H04L 69/40; H04L 9/0891
USPC .................. 713/189; 380/286; 707/640–660, 707/674–686

See application file for complete search history.

(56) References Cited

U.S. PATENT DOCUMENTS 7,162,647 B2    1/2007  Osaki
7,493,656 B2 *  2/2009  Goodwill et al. ................. 726/9
(Continued)

FOREIGN PATENT DOCUMENTS

EP    1975838    10/2008
JP    2009065528  3/2009

*Primary Examiner* — Ashok Patel
*Assistant Examiner* — Daniel Potratz
(74) *Attorney, Agent, or Firm* — Brundidge & Stanger, P.C.

(57) ABSTRACT

A storage device partitions data from a host into multiple partitioned data and distributes, encrypts and stores them together with a parity in multiple memory mediums. This storage device executes processing of restoring the partitioned data or the parity stored in a memory medium subjectable to encryption re-key based on decrypted data of the partitioned data or the parity stored in each memory medium other than the memory medium subjectable to encryption re-key among the multiple memory mediums, storing the restored partitioned data or the parity in a backup memory medium while encrypting the restored partitioned data or the parity with a new encryption key, and thereafter interchanging the backup memory medium and the memory medium subjectable to encryption re-key so that the backup memory medium will be a memory medium configuring the parity group and the memory medium subjectable to encryption re-key will be the backup memory medium.

10 Claims, 17 Drawing Sheets

(51) Int. Cl.
  *G06F 11/07* (2006.01)
  *H04L 29/14* (2006.01)
  *G06F 21/78* (2013.01)
  *G06F 11/20* (2006.01)
  *G06F 21/80* (2013.01)
  *H04L 29/06* (2006.01)
  *H04L 9/08* (2006.01)
  *G06F 11/10* (2006.01)
  *H04L 29/08* (2006.01)

(52) U.S. Cl.
  CPC ........... *G06F 21/78* (2013.01); *G06F 11/2094* (2013.01); *G06F 21/805* (2013.01); *H04L 63/0464* (2013.01); *H04L 63/065* (2013.01); *H04L 9/0891* (2013.01); *G06F 11/1008* (2013.01); *G06F 2221/2107* (2013.01); *G06F 2221/2151* (2013.01); *H04L 67/1097* (2013.01)

USPC ............ 713/189; 380/286; 707/640; 707/674

(56) References Cited

U.S. PATENT DOCUMENTS

| | | | |
|---|---|---|---|
| 8,140,864 B2 | 3/2012 | Osaki | |
| 8,171,307 B1 * | 5/2012 | Chang | 713/189 |
| 8,341,425 B2 | 12/2012 | Nakagawa et al. | |
| 2005/0204154 A1 | 9/2005 | Osaki | |
| 2007/0220376 A1 * | 9/2007 | Furukawa | 714/57 |
| 2008/0063210 A1 | 3/2008 | Goodman et al. | |
| 2008/0092029 A1 | 4/2008 | Arakawa et al. | |
| 2008/0098083 A1 | 4/2008 | Shergill et al. | |
| 2008/0229118 A1 * | 9/2008 | Kasako et al. | 713/193 |
| 2008/0240434 A1 | 10/2008 | Kitamura | |
| 2008/0260159 A1 | 10/2008 | Osaki | |
| 2009/0271638 A1 | 10/2009 | Kawakami | |
| 2011/0296195 A1 | 12/2011 | Nakagawa et al. | |

* cited by examiner

FIG.8

| KEY ID | KEY DATA | CREATION DATE |
|---|---|---|
| KEY001 | 54SD7DODE4AG45S5DFDF5PL | 2005/03/31 |
| KEY002 | 745RWP3DZAM15QOFSGDE34 | 2008/01/03 |
| KEY003 | POFSG85S542SDF9ISDFFLAE | 2008/02/01 |

| DISK ID | PG ID | KEY ID | ENCRYPTED DATE |
|---|---|---|---|
| DISK001 | PG001 | KEY001 | 2007/04/01 00:21.01 |
| DISK002 | PG001 | KEY001 | 2007/04/01 00:32.41 |
| DISK003 | PG001 | KEY001 | 2007/04/01 00:41.25 |
| DISK004 | PG001 | KEY001 | 2007/04/01 00:50.34 |
| DISK005 | | | |
| DISK006 | | | |
| DISK007 | | | |
| DISK008 | PG002 | KEY001 | 2008/01/22 03:40.11 |
| DISK009 | PG002 | KEY002 | 2008/01/22 03:50.00 |
| DISK010 | PG002 | KEY002 | 2008/01/22 03:55.23 |
| ... | ... | ... | ... |
| DISK020 | HOT SWAP | | |

| PG ID | RAID LEVEL | CAPACITY | VOLUME ID |
|---|---|---|---|
| PG001 | RAID5(3D+1P) | 150GB | VOL001 |
| PG002 | RAID5(3D+1P) | 150GB | VOL002 |
|  |  |  | VOL003 |
| PG003 | RAID5(4D+1P) | 200GB | VOL004 |
|  |  |  | VOL005 |
|  |  |  | VOL006 |
| 65A | 65B | 65C | 65D |

| ENCRYPTION MANAGEMENT | | | |
|---|---|---|---|
| ■ DISK INFORMATION | | | |
| DISK ▼ | PG ▼ | KEY ▼ | DATE ▼ |
| DISK001 | PG001 | KEY001 | 2007/04/01 00:21.01 |
| DISK002 | PG001 | KEY001 | 2007/04/01 00:32.41 |
| DISK003 | PG001 | KEY001 | 2007/04/01 00:41.25 |
| DISK004 | PG001 | KEY001 | 2007/04/01 00:50.34 |
| DISK005 | | | |
| DISK006 | | | |
| DISK007 | | | |

■ RESOURCE SELECTION CONDITION
○ DISK ID    ● PG ID    ☑ KEY ID
[DISK003 ▼]  [PG002 ▼]  [KEY003 ▼]
             PG001
             PG002
             PG003
             ☑ ENCRYPTED DATE
             [2005/10/01] ~ [2007/10/01]

■ KEY SELECTION
[KEY003 ▼] [NEW KEY]   [DONE]  [CANCEL]

FIG.17

```
SCHEDULE MANAGEMENT
```

■ TASK — 121
- START DATE: 2009/04/28 ~130
- FREQUENCY: 1/YEAR ▼ ~132
- 131

■ RESOURCE SELECTION CONDITION — 122
- ○ DISK ID: DISK003 ▼
- ● PG ID: PG002 ▼
- ☐ KEY ID: KEY003 ▼
- ☐ ENCRYPTED DATE: 2005/04/01 ~ 2009/03/31

■ KEY SELECTION — 123
- KEY003 ▼  NEW KEY

■ SCHEDULE — 124

| TASK# | DATE / FREQ | RESOURCE | NEW KEY |
|---|---|---|---|
| TASK001 | 2009/01/08  /M | PG007/KEY002 | KEY009 |
| TASK002 | 2009/02/11  /M | DISK032 | KEY004 |
| TASK003 | 2009/02/22  /Y | KEY018 | KEY011 |
| TASK004 | 2009/04/15  /W | PG011 | KEY007 |

DELETE — 135

DONE — 133    CANCEL — 134

120

STORAGE DEVICE AND ITS CONTROL METHOD

CROSS-REFERENCED TO RELATED APPLICATIONS

The present application is a continuation of application Ser. No. 12/527,160, filed Aug. 13, 2009, now U.S. Pat. No. 8,341,425; which claims priority from PCT/JP2009/059920, filed May 25, 2009, the contents of which are incorporated herein by reference.

TECHNICAL FIELD

The present invention relates to a storage device and its control method and, for example, can be suitably applied to a storage device that encrypts and stores data in a memory medium.

BACKGROUND OF THE INVENTION

Conventionally, this type of storage device encrypts data that was provided from a host together with a write request and stores such data in a memory medium, and, when a read request of that data is given from the host, the storage device reads the encrypted data from the memory medium while decrypting it and sends the decrypted data to the host.

Here, with this type of storage device, since the encryption processing and decryption processing of data are performed with an encryption key that is pre-set by a system administrator, it is desirable to periodically exchange the encryption key in order to increase the security of data stored in the memory medium.

As this kind of encryption re-key method, conventionally, proposed is a method of reading data to be subject to the encryption re-key from a memory medium while sequentially decrypting such data, and overwriting the obtained decrypted data to the same location of the memory medium by encrypting such data with a new encryption key (this is hereinafter referred to as the "overwrite method") (specification of U.S. Pat. No. 7,162,647).

In addition, as another encryption re-key method, a method of reading data that is stored in a memory medium from the memory medium while sequentially decrypting such data, and writing the obtained decrypted data into another memory medium while encrypting such data with a new encryption key (this is hereinafter referred to as the "migration method") is also being widely adopted.

SUMMARY OF THE INVENTION

Meanwhile, with the foregoing overwrite method, a pointer is used to manage the progress of the re-key processing in order to differentiate the sections in which the re-key processing is complete and the sections in which the re-key processing has not yet been performed within the storage area provided by the memory medium. Thus, with the overwrite method, if the pointer is lost due to a malfunction of the memory or the like, it will become unclear as to which encryption key should be applied to data stored in which storage area, and there is a problem in that data cannot be properly decrypted, which consequently causes the same situation as data loss.

On the other hand, with the foregoing migration method, the encryption re-key processing is performed in parity group units. Thus, with the migration method, there is a problem in that the same number of memory mediums as the memory mediums configuring the parity group to be subject to the encryption re-key becomes unnecessarily required.

The present invention was devised in view of the foregoing problems encountered in the conventional technology. Thus, an object of the present invention is to propose a storage device and its control method capable of performing encryption re-key processing with high reliability and with low cost.

In order to achieve the foregoing object, the present invention provides a storage device which partitions data from a host into a plurality of partitioned data and creates a parity based on the plurality of partitioned data, distributes the created parity and the plurality of partitioned data to a plurality of memory mediums configuring a same parity group, and encrypts and stores the created parity and the plurality of partitioned data therein. This storage device comprises a restoration unit for restoring the partitioned data or the parity stored in a memory medium to be subject to encryption re-key based on decrypted data of the partitioned data or the parity stored in each memory medium other than the memory medium to be subject to encryption re-key among the plurality of memory mediums, a storage unit for storing the restored partitioned data or the parity in a backup memory medium while encrypting the restored partitioned data or the parity with a new encryption key, and a memory medium swap unit for interchanging the backup memory medium and the memory medium to be subject to encryption re-key so that the backup memory medium will be a memory medium configuring the parity group and the memory medium to be subject to encryption re-key will be the backup memory medium. By sequentially making each memory medium configuring the parity group to be the memory medium to be subject to encryption re-key, an encryption key of data stored in each memory medium configuring the parity group is updated to the new encryption key.

The present invention additionally provides a control method of a storage device which partitions data from a host into a plurality of partitioned data and creates a parity based on the plurality of partitioned data, distributes the created parity and the plurality of partitioned data to a plurality of memory mediums configuring a same parity group, and encrypts and stores the created parity and the plurality of partitioned data therein. This control method of a storage device comprises a first step of restoring the partitioned data or the parity stored in a memory medium to be subject to encryption re-key based on decrypted data of the partitioned data or the parity stored in each memory medium other than the memory medium to be subject to encryption re-key among the plurality of memory mediums, a second step of storing the restored partitioned data or the parity in a backup memory medium while encrypting the restored partitioned data or the parity with a new encryption key, and a third step of interchanging the backup memory medium and the memory medium to be subject to encryption re-key so that the backup memory medium will be a memory medium configuring the parity group and the memory medium to be subject to encryption re-key will be the backup memory medium. By sequentially making each memory medium configuring the parity group to be the memory medium to be subject to encryption re-key, an encryption key of data stored in each memory medium configuring the parity group is updated to the new encryption key.

According to the encryption re-key method of the present invention, there is no fear as to which encryption key should be applied to data stored in which storage area become unclear, and it is not necessary to prepare the same number of memory mediums as the memory mediums configuring the parity group to be subject to the encryption re-key. Consequently, the present invention is able to perform encryption re-key processing with high reliability and with low cost.

BRIEF DESCRIPTION OF THE DRAWINGS

FIG. 8 is a conceptual diagram showing a configuration of an encryption key management table;

FIG. 9 is a conceptual diagram showing a configuration of a disk management table;

FIG. 10 is a conceptual diagram showing a configuration of a volume management table;

FIG. 11 is a schematic diagram schematically showing a configuration of an encryption re-key setting screen;

FIG. 17 is a schematic diagram schematically showing a configuration of a schedule setting screen.

BEST MODE FOR CARRYING OUT THE INVENTION

Embodiments of the present invention are now explained in detail with reference to the attached drawings.

Figure 1:
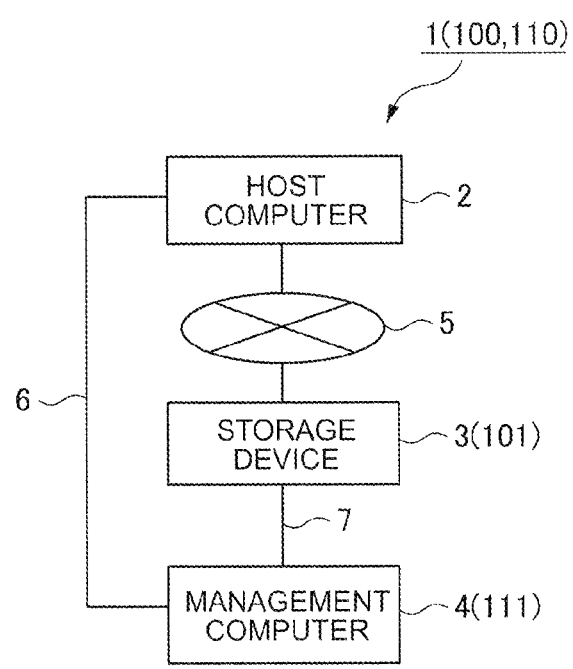
FIG. 1 is a block diagram showing a schematic configuration of a computer system according to an embodiment of the present invention.

(1) First Embodiment (1-1) Configuration of Computer System of Present Embodiment FIG. 1 shows the overall computer system 1 according to this embodiment. The computer system 1 comprises a host computer 2, a storage device 3 and a management computer 4. In the computer system 1, the host computer 2 and the storage device 3 are connected via a first network 5 such as a SAN (Storage Area Network), and the host computer 2 and the management computer 4, and the storage device 3 and the management computer 4 are respectively connected via second and third networks 6, 7 such as a LAN (Local Area Network).

Figure 2:
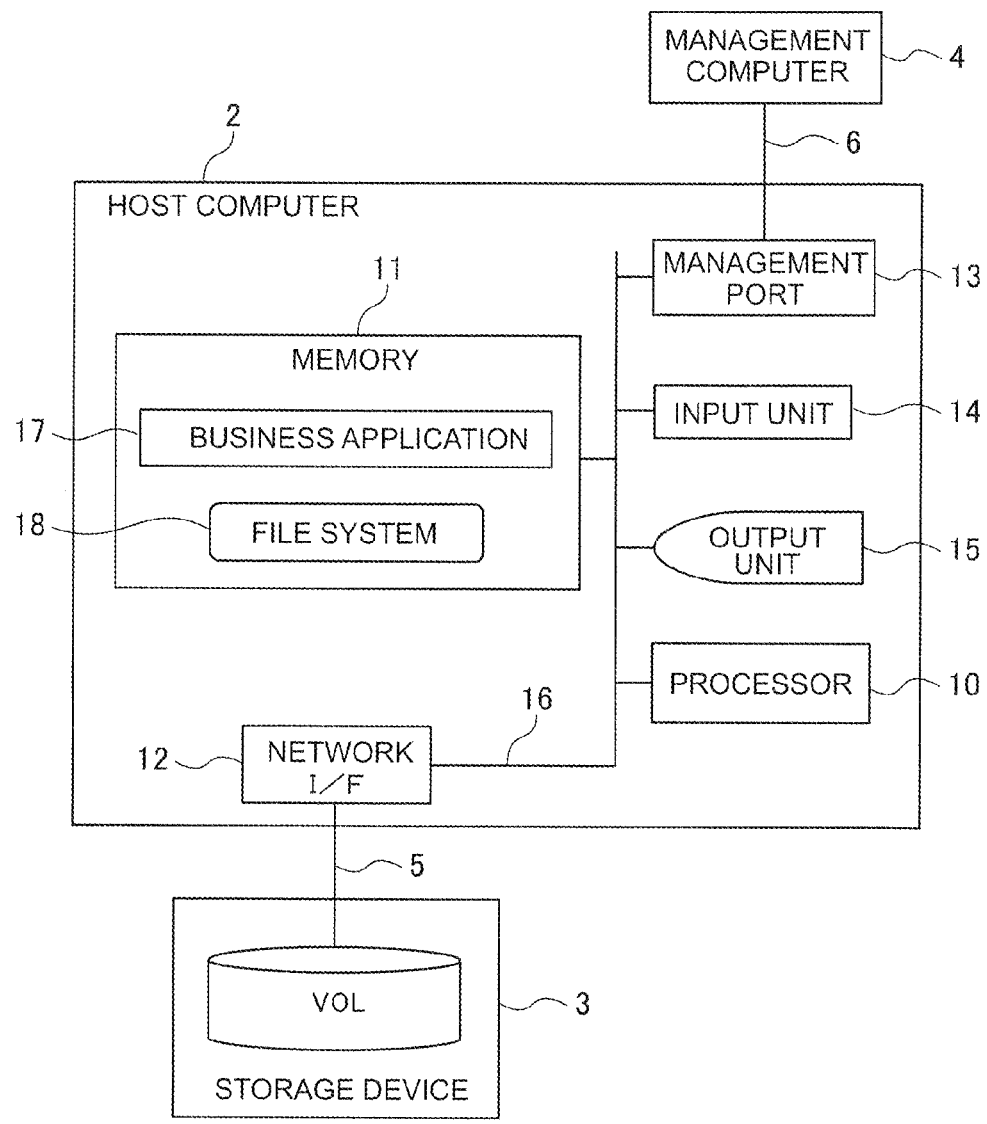
FIG. 2 is a block diagram showing a configuration of a host computer.

The host computer 2 comprises, as shown in FIG. 2, a processor 10, a memory 11, a network interface 12, a management port 13, an input device 14 and an output device 15, and is configured by the foregoing components being mutually connected via an internal bus 16.

The processor 10 possesses the function of governing the operational control of the overall host computer 2, and executes various types of control processing based on business application software 17 and a file system 18 stored in the memory 11. The memory 11 is used for storing other control programs in addition to the business application software 17 and the file system 18, and is also used as a work memory of the processor 10.

The network interface 12 is an interface for the host computer 2 to communicate with the storage device 3 via the first network 5. The host computer 2 reads and writes data from and into a corresponding logical volume VOL in the storage device 3 via the network interface 12.

The management port 13 is a port for connecting the host computer 2 to the second network 6. The management port 13 is assigned a unique network address such as a WWN (World Wide Name) or an IP (Internet Protocol) address.

The input device 14 is configured from a keyboard, a mouse and the like, and is used for inputting various operations of a user. Moreover, the output device 15 is configured from a display, a speaker and the like, and displays a GUI (Graphical User Interface) and various types of information based on the control of the processor.

Figure 3:
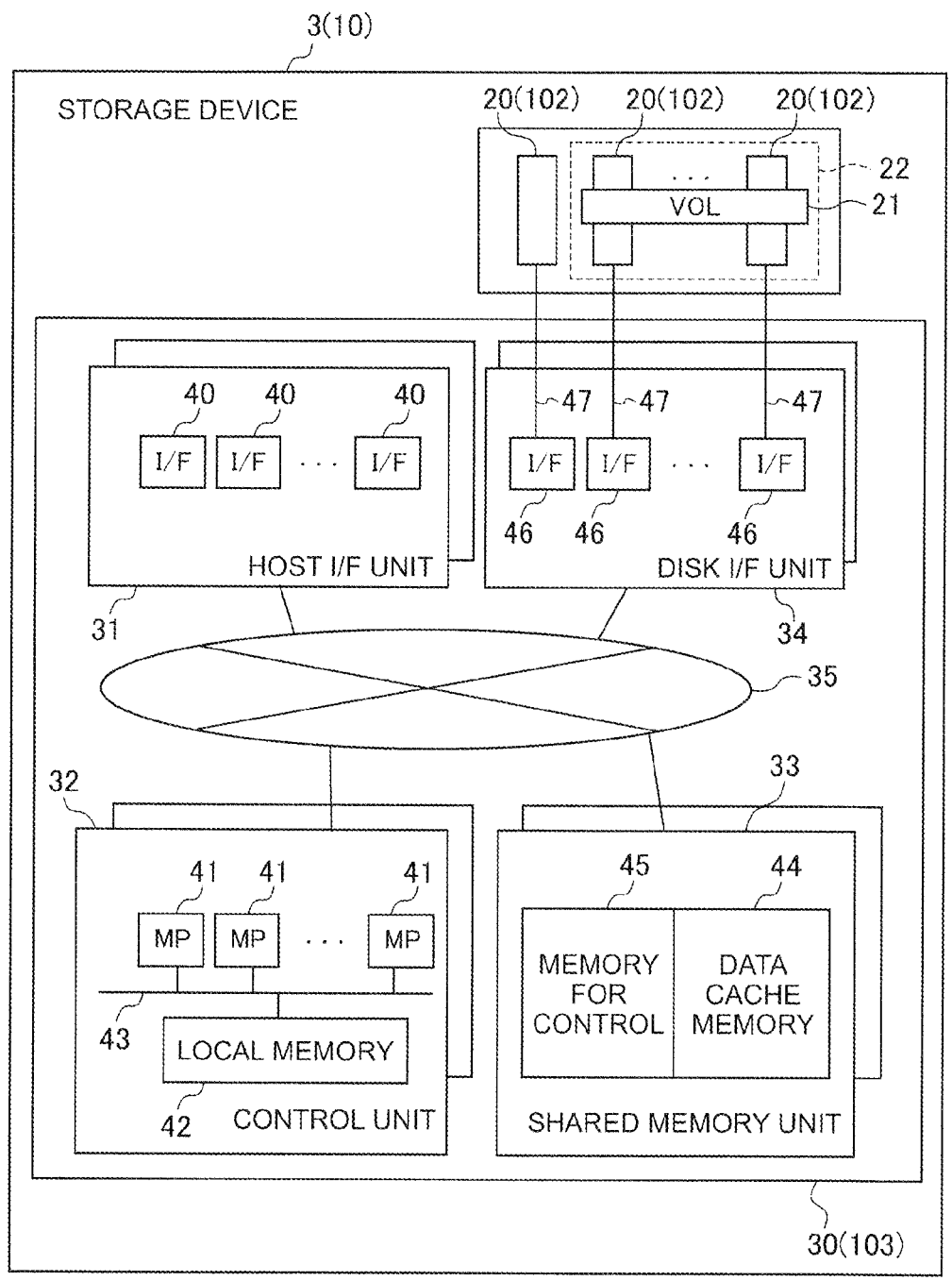
FIG. 3 is a block diagram showing a configuration of a storage device.

The storage device 3 is configured, as shown in FIG. 3, from a memory unit 21 comprising a plurality of hard disk devices 20, and a control unit 30 for controlling the input and output of data to and from the hard disk devices 20.

The hard disk devices 20 are configured, for example, from expensive disks such as SCSI (Small Computer System Interface) disks or inexpensive disks such as SATA (Serial AT Attachment) disks. One parity group 22 is configured from one or more hard disk devices 20, and one or more logical volumes VOL are set on a physical storage area provided by the respective hard disk devices 20 configuring one parity group 22. Further, data from the host 2 is stored in units of a block (this is hereinafter referred to as the "logical block") of a prescribed size in the logical volumes VOL.

Each logical volume VOL is assigned a unique ID (this is hereinafter referred to as the "volume ID"). In the case of this embodiment, the input and output of data is performed by combining the volume ID and a unique number (this is hereinafter referred to as the "block number") of the logical block that is assigned to each logical block and using such combination as the address, and then designating such address.

Moreover, the control unit 30 comprises a plurality of host interface units 31, a plurality of control units 32, a plurality of shared memories 33 and a plurality of disk interface units 34 that are respectively packaged, and is configured by the foregoing components being connected via an internal network 35.

The host interface unit 31 comprises a plurality of host interfaces 40 configured, for instance, from an NIC (Network Interface Card) or a LAN card, and the host interfaces 40 are connected to the first network 5 and the third network 7.

The control unit 32 is configured by a plurality of micro processors 41 and a local memory 42 being connected via a bus 43. The local memory 42 stores control programs and control information that are read from the shared memory 33 described later, and, based on such control programs and control information, the respective micro processors 41 execute data I/O processing according to an I/O request from the host computer 2, encryption/decryption processing of that data, and correction copy processing described later.

The shared memory 33 comprises a data cache memory 44 and a control information memory 45 configured from a DRAM (Dynamic Random Access Memory) or the like. The data cache memory 44 is used for temporarily storing data to be read from and written into the hard disk devices 20, and the control information memory 45 is primarily used for storing various types of control information and commands such as the system configuration information concerning the configuration of the overall storage device 3.

The disk interface unit 34 comprises a plurality of disk interfaces 46. The plurality of disk interfaces 46 are respectively connected to the hard disk devices 20 of the memory unit 21 via a cable 47, and intermediates the processing of passing data that is subject to reading and writing between the control unit 30 and the memory unit 21.

The internal network 35 is configured, for example, from a switch or a bus such as an ultrafast high-speed crossbar switch for transferring data by way of high-speed switching. The sending and receiving of data among the host interface unit 31, the control unit 32, the shared memory 33 and the disk interface unit 34 are performed via the internal network 35.

Figure 4:
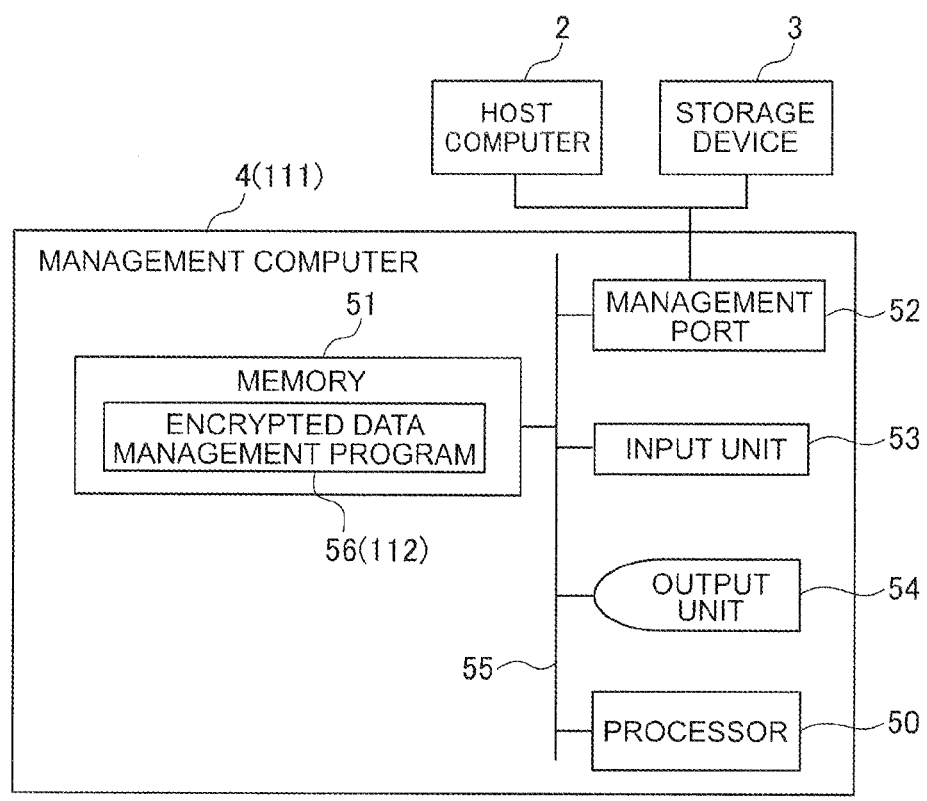
FIG. 4 is a block diagram showing a configuration of a management computer.

The management computer 4 is configured, as shown in FIG. 4, by a processor 50, a memory 51, a management port 52, an input device 53 and an output device 54 being connected via an internal bus 55.

Since the processor 50, the memory 51, the management port 52, the input device 53 and the output device 54 have the same functions as the corresponding components of the host computer 2 (FIG. 2), the explanation thereof is omitted.

Incidentally, in the case of the management computer 4, the memory 51 stores an encryption management program 56 described later.

(1-2) Encryption Key Exchange Method of Present Embodiment

The encryption re-key function loaded in the storage device 3 is now explained.

Figure 5:
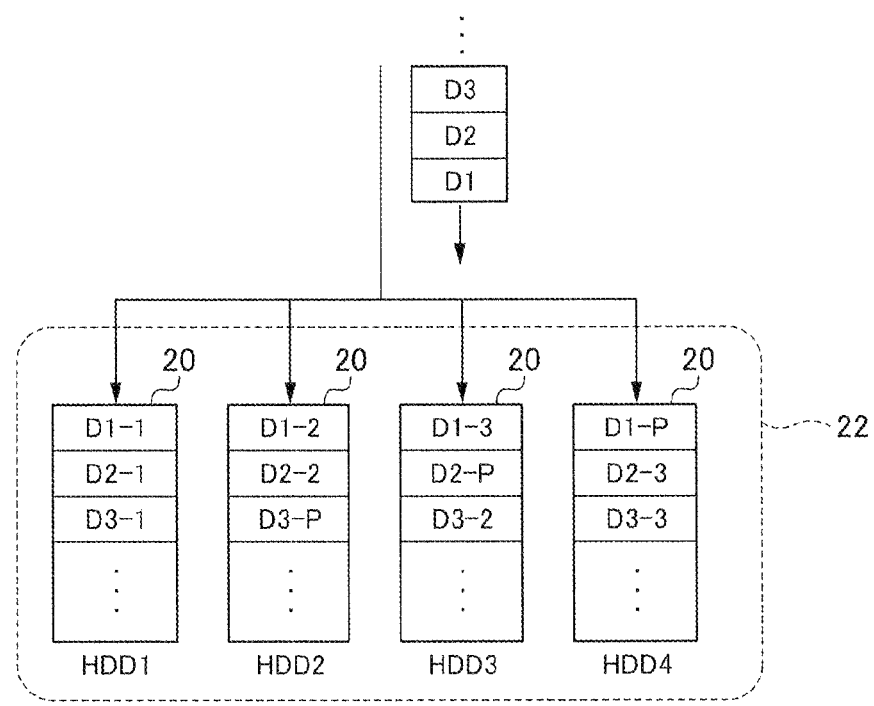
FIG. 5 is a conceptual diagram explaining a correction copy function.

With the storage device 3, when writing data into the logical volume VOL provided by the parity group 22 (FIG. 3), as shown in FIG. 5, the write-target data D, D2, D3, . . . provided by the host computer 2 are partitioned into a plurality of data (this is hereinafter referred to as the "partitioned data") D1-1 to D1-3, D2-1 to D2-3, D3-1 to D3-3 in prescribed units, redundant data (this is hereinafter referred to as the "parity") D1-P, D2-P, D3-P is created based on the partitioned data D1-1 to D1-3, D2-1 to D2-3, D3-1 to D3-3, and the partitioned data D1-1 to D1-3, D2-1 to D2-3, D3-1 to D3-3 and the parity D1-P, D2-P, D3-P are distributed to and stored in a plurality of hard disk devices 20 configuring the same parity group 22 via the disk interface unit 34.

If a failure occurs in one of the hard disk devices 20 in the parity group 22, the storage device 3 executes correction copy processing of restoring the data stored in the failed hard disk device 20 by using the data (partitioned data D1-1 to D1-3, D2-1 to D2-3, D3-1 to D3-3 or parity D1-P, D2-P, D3-P) stored in the other hard disk devices 20 configuring that parity group 22, and stores the restored data in a spare disk (this is hereinafter referred to as the "spare disk") 20.

In addition, the storage device 3 according to this embodiment is loaded with an encryption re-key function for performing encryption re-key processing by using the foregoing correction copy function.

Figure 6:
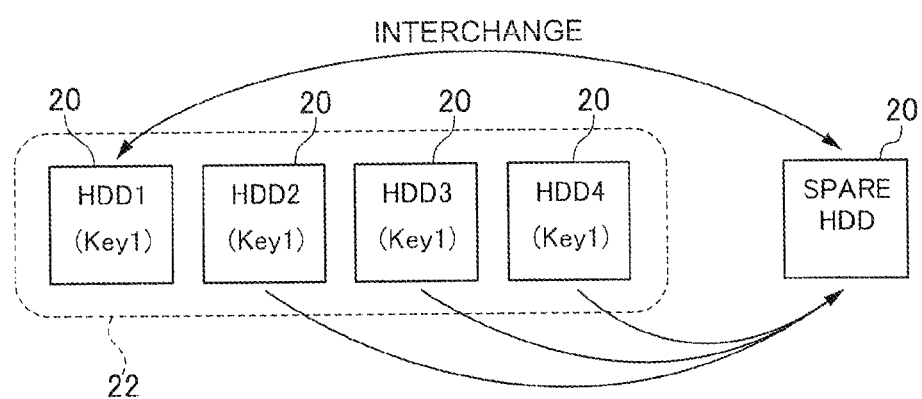
FIG. 6 is a conceptual diagram schematically explaining an encryption re-key method according to an embodiment of the present invention.

For practical purposes, during the encryption re-key processing, as shown in FIG. 6, the storage device 3 restores the data stored in the hard disk device 20 to be subject to an encryption re-key (this is hereinafter referred to as the "encryption re-key target") among the plurality of hard disk devices 20 configuring the parity group 22 based on the foregoing correction copy processing, and encrypts the restored data with a new encryption key and copies such encrypted data to the spare disk 20. The storage device 3 thereafter swaps the hard disk device 20 that was the encryption re-key target with the spare disk 20.

The storage device 3 executes the same correction copy processing to each of the remaining hard disk devices 20 configuring that parity group 22. Thereby, the encryption key of the data stored in each of the hard disk devices 20 configuring the parity group 22 can be replaced with a new encryption key.

Figure 7:
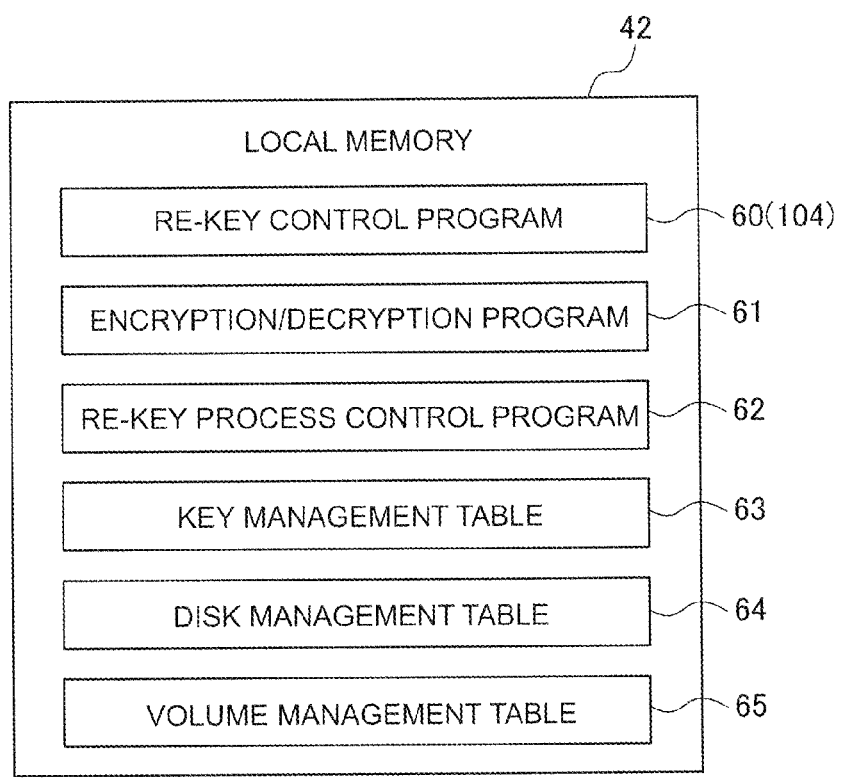
FIG. 7 is a conceptual diagram explaining various control programs and various tables retained in the storage device in relation to the encryption re-key method according to an embodiment of the present invention.

As means for executing the encryption re-key processing according to the present embodiment as described above, the local memory 42 of the control unit 32 (FIG. 3) in the storage device 3 stores, as shown in FIG. 7, control programs such as an encryption re-key control program 60, an encryption/decryption program 61 and an encryption re-key process control program 62, and management information such as an encryption key management table 63, a disk management table 64 and a volume management table 65.

Among the above, the encryption re-key control program 60 is a control program for exchanging the encryption key using the correction copy function as described above, and the encryption/decryption program 61 is a program for encrypting or decrypting data. Moreover, the encryption re-key process control program 62 is a program for executing corresponding processing when a failure occurs in any one of the hard disk devices 20 in the storage device 3 during the execution of the foregoing encryption re-key processing.

Incidentally, although the processing entity of the various types of processing is explained as a "program," it goes without saying that, in actuality, the micro processor 41 (FIG. 3) in the control unit 32 (FIG. 3) executes the processing based on the "program."

Meanwhile, the encryption key management table 63 is a table for managing the encryption keys in the storage device 3 and, as shown in FIG. 8, is configured from a key ID column 63A, a key data column 63B and a creation date column 63C.

The key ID column 63A stores a unique ID (key ID) that is assigned to the corresponding encryption key, and the key data column 63B stores data of such encryption key. The creation date column 63C stores the date that the encryption key was created. Accordingly, FIG. 8 shows that the encryption key of "54SD7DODE4AG45S5DFDF5PL" was created on "2005 Mar. 31," and the encryption key is assigned a key ID of "KEY001."

The disk management table 64 is a table for managing the hard disk devices 20 existing in the storage device 3 and, as shown in FIG. 9, is configured from a disk ID column 64A, a parity group ID column 64B, a key ID column 64C and an encrypted date/time column 64D.

The disk ID column 64A stores an ID (disk ID) that is assigned to the corresponding hard disk device 20 and which is unique to that hard disk device 20, and the parity group ID column 64D stores an ID (parity group ID) that is assigned to the parity group 22 to which that hard disk device 20 belongs and which is unique to that parity group 22.

The key ID column 64C stores a key ID of the encryption key that was used in encrypting the data stored in that hard disk device 20, and the encrypted date/time column 64D stores the date and time that the data stored in that hard disk device 20 was encrypted.

Accordingly, the example illustrated in FIG. 9 shows that the parity group 22 assigned with a parity group ID of "PG001" is configured from the four hard disk devices 20 respectively assigned a disk ID of "DISK001" to "DISK004," and the data stored in the logical volumes VOL provided by the parity group 22 was encrypted at "2007/04/01 00:21.01" using an encryption key having a key ID of "KEY001."

Moreover, FIG. 9 also shows that none of the three hard disk devices 20 respectively assigned a disk ID of "DISK005" to "DISK007" belong to the parity group 22. Incidentally, although the hard disk device 20 of "DISK020" stores the information of "HOT SWAP" in the parity group ID column 64B, this represents that this hard disk device 20 is a spare disk.

The volume management table 65 is a table for managing the logical volumes VOL defined in the storage device 3 and, as shown in FIG. 10, is configured from a parity group ID column 65A, a RAID level column 65B, a capacity column 65C and a volume ID column 65D.

The parity group ID column 65A stores a parity group ID of the corresponding parity group 22, and the RAID level column 65B stores a RAID (Redundant Arrays of Inexpensive Disks) level that is set regarding that parity group 22. The capacity column 65C stores a capacity of that parity group 22, and the volume ID column 65D stores a volume ID of the logical volume configuring that parity group 22.

Accordingly, the example illustrated in FIG. 10 shows that the logical volume VOL that is assigned a volume ID of "VOL 001" is configuring the parity group assigned with a parity group ID of "PG001" in which the capacity is "150 GB" and the RAID level is "RAID 5 (3D+1)."

(1-3) Encryption Key Exchange Command Screen

FIG. 11 shows an encryption re-key setting screen 70 to be displayed on the management computer 4 (FIG. 4) upon booting the encryption management program 56 (FIG. 4) in such management computer 4.

The encryption re-key setting screen 70 is a GUI (Graphical User Interface) for setting the various conditions upon causing the storage device 3 to execute the encryption re-key processing based on the encryption re-key function described above, and is configured from a disk information area 71, a resource selection area 72 and an exchange key selection area 73.

Among the above, the disk information area 71 displays, in list format, the same information as the disk management table 64 (FIG. 9) based on information concerning the hard disk devices 20 in the storage device 3 which was collected by the encryption management program 56 from such storage device 3.

Moreover, the resource selection area 72 is a GUI area for selecting the encryption re-key target. In this resource selection area 72, the user is able to select the encryption re-key target by designating any one of the conditions among disk ID, parity group ID, key ID or period.

For example, if the disk ID is to be designated as the condition, the user selects a radio button 80 corresponding to the disk ID, clicks a pull-down button 82 of the selected disk ID display column 81 to display a pull-down menu listing the disk IDs of all hard disk devices 20 in the storage device 3, and selects one disk ID of the hard disk device 20 to become the encryption re-key target from the pull-down menu. Consequently, the disk ID selected thereby is displayed on the selected disk ID display column 81. Then, the hard disk device 20 in which its disk ID is displayed on the selected disk ID display column 81 is selected as the encryption re-key target.

Moreover, if the parity group ID is to be designated as the condition, the user selects a radio button 83 corresponding to the parity group ID, clicks a pull-down menu button 85 of the selected parity group ID display column 84 to display a pull-down menu 86 listing the parity group IDs of all parity groups 22 defined in the storage device 3, and selects one parity group ID of the parity group 22 to become the encryption re-key target from the pull-down menu 86. Consequently, the parity group ID selected thereby is displayed on the selected parity group ID display column 84. Then, the parity group 22 in which its parity group ID is displayed on the selected parity group ID display column 84 is selected as the encryption re-key target.

Furthermore, if the key ID is to be designated as the condition, the user displays a check mark in the corresponding check box 87, clicks a pull-down menu button 89 of the selected key ID display column 88 to display a pull-down menu listing the key IDs of all encryption keys that are used in the storage device 3, and selects one key ID as the encryption key to become the encryption re-key target from the pull-down menu. Consequently, the key ID selected thereby is displayed on the selected key ID display column 88. Then, the hard disk device 20 storing the data that was encrypted with the encryption key in which its key ID is displayed in the selected key ID display column 88 is selected as the encryption re-key target.

In addition, if the period is to be designated as the condition, the user displays a check mark in the corresponding check box 90, and inputs the first day and the last day in a first day of period display column and a last day of period display column 92, respectively. Consequently, the hard disk device 20 storing the data that was encrypted during the period from the day displayed in the first day of period display column 91 to the day displayed in the last day of period display column 92 is selected as the encryption re-key target.

Incidentally, the encryption re-key target may also be selected by combining the foregoing conditions. For example, if the parity group ID and the key ID are selected as the two conditions of the encryption re-key target, the hard disk device 20 storing the data that was encrypted with that encryption key in the parity group 22 assigned with that parity group ID will become the encryption re-key target.

Moreover, if the parity group ID and the data encryption period are selected as the two conditions of the encryption re-key target, the hard disk device 20 storing the data that was encrypted during that period in the parity group 22 assigned with that parity group ID will become the encryption re-key target.

Further, if the parity group ID, the key ID and the period are selected as the three conditions of the encryption re-key target, the hard disk device 20 storing the data that was encrypted with the encryption key assigned with that key ID during that period in the parity group 22 assigned with that parity group ID will become the encryption re-key target.

In addition, if the key ID and the period are selected as the two conditions of the encryption re-key target, the hard disk device 20 storing the data that was encrypted during that period with an encryption key assigned with that key ID will become the encryption re-key target.

Meanwhile, the exchange key selection area 73 is a GUI area for selecting the new encryption key to be used in the encryption re-key processing. The user may select the new encryption key in the exchange key selection area 73.

For practical purposes, when selecting the new encryption key, the user clicks a pull-down menu button 94 of the new encryption key ID display column 93 to display a pull-down menu listing the key IDs of all encryption keys that are created in advance, and selects one key ID of the encryption key to be newly used from the pull-down menu. Consequently, the key ID selected thereby is displayed on the new encryption key ID display column 93. The user thereafter clicks the new key button. As a result, the encryption key assigned with the key ID that is displayed in the new encryption key ID display column 93 is selected as the new encryption key.

With the encryption re-key setting screen 70, after selecting the encryption re-key target and the new encryption key as described above, the run command of the encryption re-key processing can be input by clicking the execution button 74 displayed at the lower right corner of the screen.

In the foregoing case, the execution command of the encryption re-key processing (this is hereinafter referred to as the "encryption re-key command") containing information related to the encryption re-key target and the new encryption key that were selected by the user using the encryption re-key setting screen 70 is sent from the management computer 4 to the storage device 3. Based on this encryption re-key command, the encryption re-key processing is executed by the storage device 3 as described later.

Incidentally, if the cancel button 75 displayed at the lower right corner of the screen is clicked in the encryption re-key setting screen 70, all user operations that were performed in the encryption re-key setting screen 70 will be cancelled.

(1-4) Encryption Key Exchange Processing in Present Embodiment

The processing contents of the encryption re-key control program 60 and the encryption re-key process control program 62 (FIG. 7) of the storage device 3 that received the foregoing encryption re-key command are now explained.

(1-4-1) First Encryption Key Exchange Processing

Figure 12:
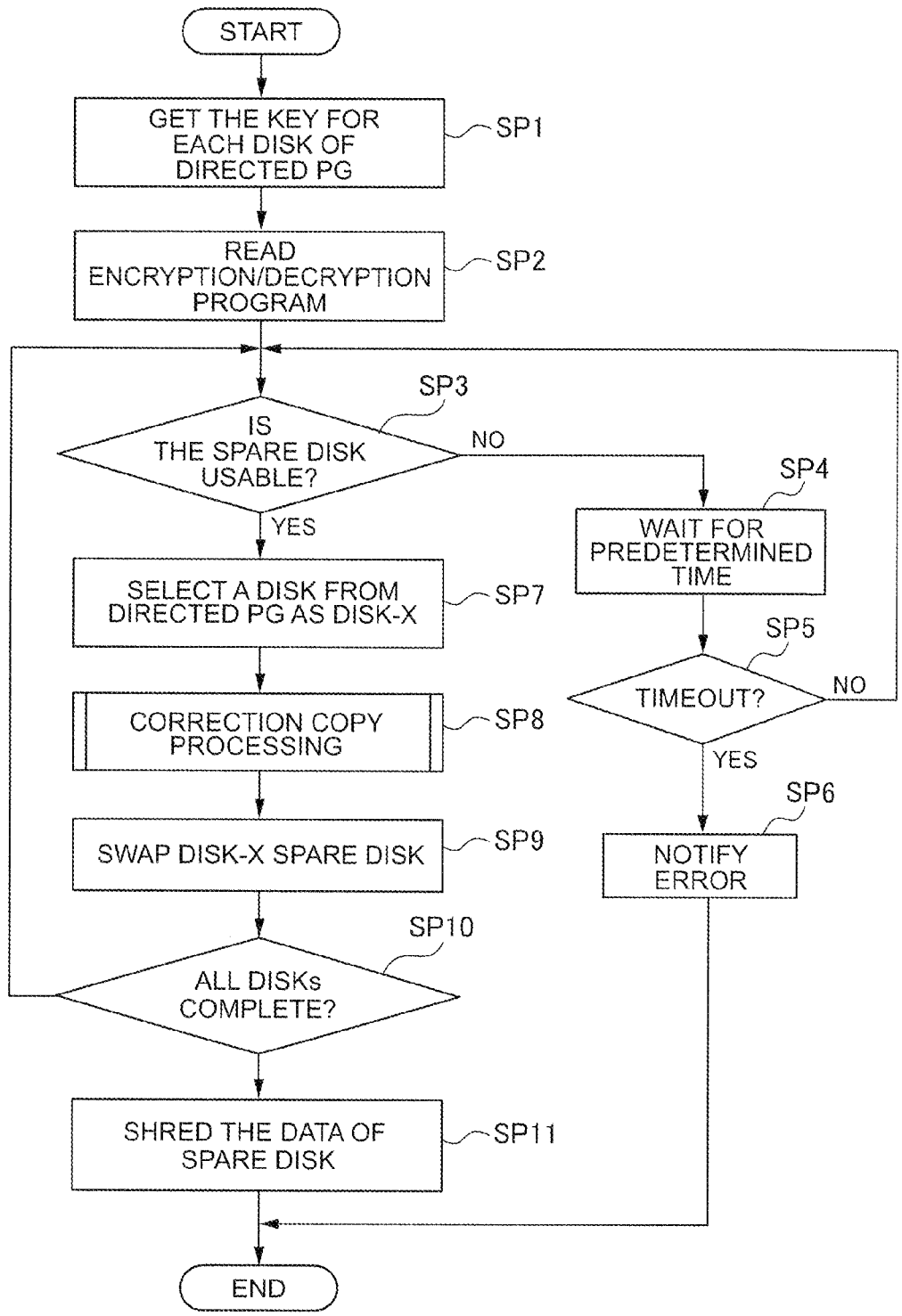
FIG. 12 is a flowchart showing a processing routine of first encryption re-key processing.

FIG. 12 shows a processing routine of the first encryption re-key processing to be executed by the encryption re-key control program 60 when it receives the foregoing encryption re-key command with the parity group 22 (FIG. 3) designated as the encryption re-key target. When the encryption re-key control program 60 receives the encryption re-key command, it executes the encryption re-key processing to the respective hard disk devices 20 belonging to the designated parity group (this is hereinafter referred to as the "designated parity group") 22 according to this processing routine.

Specifically, when the encryption re-key control program 60 receives the encryption re-key command, it starts the first encryption re-key processing, and foremost refers to the disk management table 64 (FIG. 9) to detect the key ID of the encryption key that was used upon encrypting the data that is stored in that hard disk device 20 regarding each of the hard disk devices 20 belonging to that designated parity group 22 (SP1).

Subsequently, the encryption re-key control program 60 reads the encryption/decryption program 61 (FIG. 7) from a prescribed hard disk device 20, which is being used for storing control programs in the memory unit 21, into the local memory 42 (FIG. 3) (SP2), and thereafter determines whether the spare disk 20 is usable (SP3).

Here, if the spare disk 20 is already being used or if such spare disk is subject to a failure, a negative result is obtained in the foregoing determination. Consequently, the encryption re-key control program 60 waits for a predetermined time (SP4), thereafter determines whether it is time out (where the retry count reached a predetermined count) (SP5), and subsequently returns to step SP3.

The encryption re-key control program 60 repeats the same processing until it obtains a positive result at step SP3 or step SP5, and, upon obtaining a positive result at step SP5, the encryption re-key control program 60 notifies an error to the management computer 4 (SP6), and thereafter ends the first encryption re-key processing.

Meanwhile, if the encryption re-key control program 60 obtains a positive result in the determination at step SP3, it selects one hard disk device 20 belonging to the designated parity group 22 (SP7).

Subsequently, the encryption re-key control program 60 corrects and copies (performs correction copy to) the data (partitioned data or parity) stored in that hard disk device 20 to the spare disk 20 while encrypting such data using the new encryption key designated in the encryption re-key command (SP8).

Subsequently, the encryption re-key control program 60 swaps the hard disk device 20 selected at step SP7 and the spare disk 20. Specifically, the encryption re-key control program 60 sets the hard disk device 20 selected at step SP7 as the spare disk 20, and sets the previous spare disk 20 as the hard disk device 20 belonging to the designated parity group 22 (SP9).

More specifically, the encryption re-key control program 60 stores "HOT SWAP," which means that that hard disk device 20 is the spare disk, in the parity group ID column 64G of the entry corresponding to the hard disk device 20 that was selected at step SP7, and stores the parity group ID of the designated parity group 22 in the parity group ID column 64B of the entry corresponding to the hard disk device 20 that was previously set as the spare disk in the disk management table 64 (FIG. 9).

Moreover, the encryption re-key control program 60 respectively copies, and thereafter erases, the information that is stored in the parity group ID column 65A, the RAID level column 65B and the capacity column 65C of the entries corresponding to the hard disk device 20 that was selected at step SP7 to the parity group ID column 65A, the RAID level column 65B and the capacity column 65C of the entries corresponding to the hard disk device 20 that was previously set as the spare disk in the volume management table 65 (FIG. 10).

Subsequently, the encryption re-key control program 60 determines whether the execution of the same processing regarding all hard disk devices 20 belonging to the designated parity group 22 is complete (SP10).

If the encryption re-key control program 60 obtains a negative result in this determination, it returns to step SP3, and thereafter repeats the same processing while sequentially interchanging the hard disk device 20 that was selected at step SP7 with the other hard disk devices 20 (SP3 to SP10-SP3).

Consequently, it is possible to correct and copy (perform correction copy to) the data stored in that hard disk device 20 regarding the respective hard disk devices 20 belonging to the designated parity group 22 to the spare disk 20 while encrypting such data with a new encryption key.

When the encryption re-key control program 60 obtains a positive result at step SP10 as a result of eventually completing the correction copy of the data that is stored in each of the hard disk devices 20 belonging to the designated parity group 22 to other hard disk devices 20, it permanently deletes the data that is stored in the hard disk device 20 that was lastly set as the spare disk 20 in the foregoing processing (SP11), and thereafter ends the first encryption re-key processing.

(1-4-2) Correction Copy Processing

Figure 13:
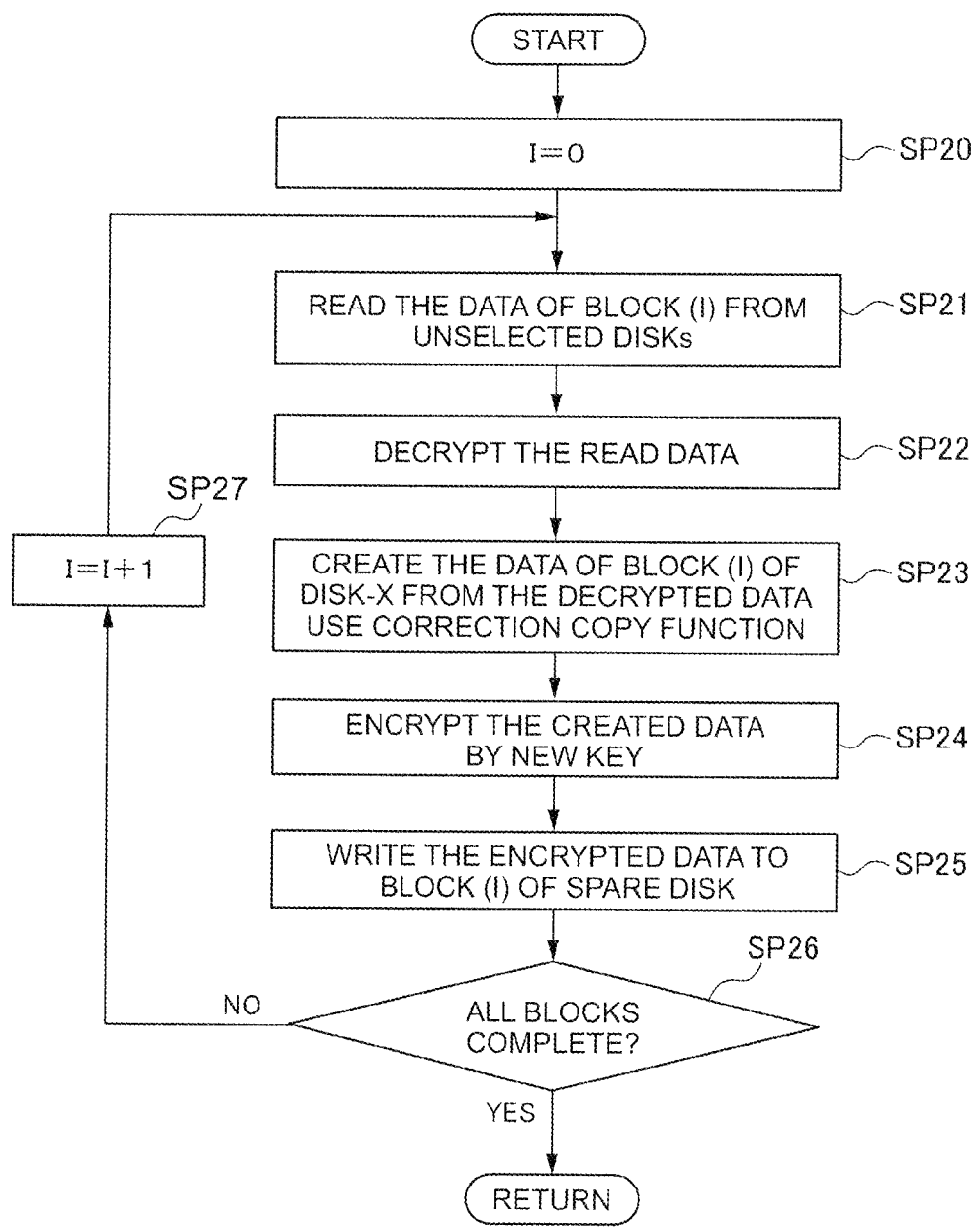
FIG. 13 is a flowchart showing a processing routine of correction copy processing.

FIG. 13 shows the specific processing contents of the correction copy processing to be executed at step SP8 of the foregoing encryption re-key processing.

When the encryption re-key control program 60 proceeds to step SP8 of the first encryption re-key processing, it starts this correction copy processing, and foremost resets (sets to "0") the count value of a prescribed counter (this is hereinafter referred to as the "block counter") (SP20).

Subsequently, the encryption re-key control program 60 respectively reads data (partitioned data or parity) that is stored in the logical block assigned with the same block number as the count value of the block counter from the respective hard disk devices 20 belonging to the designated parity group 22 other than the hard disk device 20 as the encryption re-key target (SP21). Then the encryption re-key control program 60 respectively decrypts one logical block worth of the respective data that were read from the respective hard disk devices 20 (SP22).

Subsequently, the encryption re-key control program 60 creates, using the correction copy function, the data that should probably be stored in the logical block assigned with the same block number as the count value of the block counter in the hard disk device 20 as the encryption re-key target based on the respective data that were decrypted at step SP22 (SP23).

The encryption re-key control program 60 thereafter encrypts the created data using the new encryption key that is designated in the encryption re-key command (SP24), and writes the encrypted data into the logical block in which the block number in the spare disk 20 is "I" (SP25).

Subsequently, the encryption re-key control program 60 determines whether the execution of the same processing regarding all logical blocks in the hard disk device 20 as the encryption re-key target is complete (SP26).

If the encryption re-key control program 60 obtains a negative result in this determination, it increments the count value of the block counter by one (SP27), and thereafter returns to step SP21. The encryption re-key control program 60 thereafter repeats the same processing.

When the encryption re-key control program 60 obtains a positive result at step SP26 as a result of eventually completing the same processing regarding all logical volumes in the target hard disk device 20 (that is, when the correction copy regarding the target hard disk device 20 is complete), it ends the encryption re-key execution processing and returns to the foregoing first encryption re-key processing (FIG. 12).

(1-4-3) Second Encryption Key Exchange Processing

Figure 14:
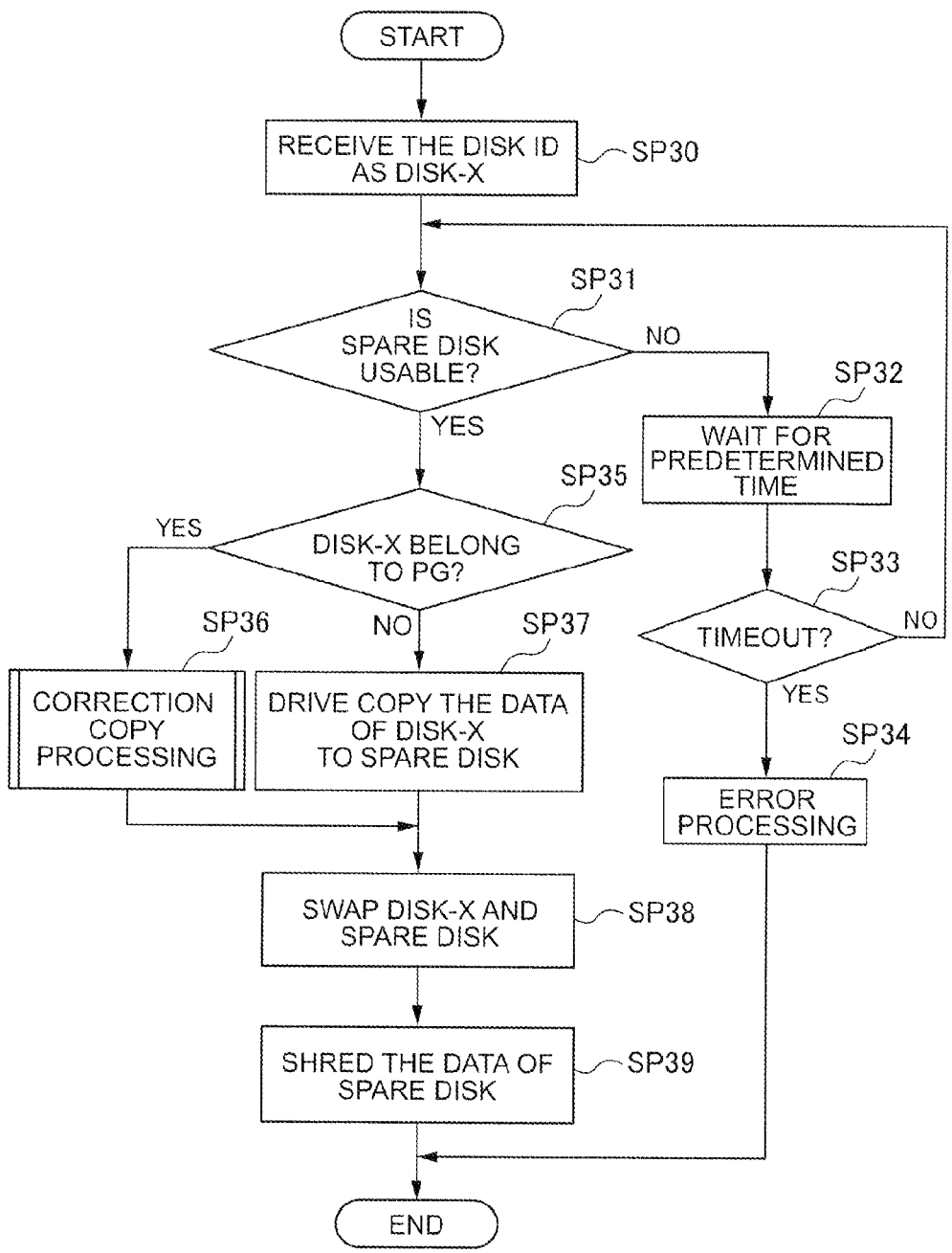
FIG. 14 is a flowchart showing a processing routine of second encryption re-key processing.

Meanwhile, FIG. 14 shows a processing routine of the second encryption re-key processing to be executed by the encryption re-key control program 60 when it receives the foregoing encryption re-key command in which the hard disk device 20 is designated as the encryption re-key target. When the encryption re-key control program 60 receives the foregoing encryption re-key command, it executes the encryption re-key processing to the hard disk device (this is hereinafter referred to as the "designated hard disk device") 20 that is designated in the encryption re-key command according to this processing routine.

Specifically, when the encryption re-key control program 60 receives the encryption re-key command, it starts the encryption re-key processing, and foremost acquires the disk ID that is designated in the encryption re-key command (SP30).

Subsequently, the encryption re-key control program 60 determines whether the spare disk 20 is usable (SP31). If the encryption re-key control program 60 obtains a negative result in this determination, it proceeds to step SP32, and performs the processing of step SP32 to step SP34 as with step SP4 to step SP6 of the first encryption re-key processing described above with reference to FIG. 12.

Meanwhile, if the encryption re-key control program 60 obtains a positive result in the determination at step SP31, it refers to the volume management table 65 (FIG. 9), and determines whether the designated hard disk device 20 belongs to any one of the parity groups 22 (SP35).

If the encryption re-key control program 60 obtains a positive result in this determination, it executes the correction copy processing described above with reference to FIG. 13 so as to correct and copy (perform correction copy to) the data (partitioned data or parity) stored in that designated hard disk device 20 while encrypting such data with the new encryption key that is designated in the encryption re-key command (SP36).

Meanwhile, if the encryption re-key control program 60 obtains a negative result in the determination at step SP35, it decrypts the data stored in the designated hard disk device 20 using the original encryption key, and thereafter copies the decrypted data to the spare disk 20 while encrypting such data with the new encryption key that is designated in the encryption re-key command (SP37).

Subsequently, the encryption re-key control program 60 swaps the designated hard disk device 20 and the spare disk 20 as with step SP9 (FIG. 12) of the first encryption re-key processing (SP38).

Then the encryption re-key control program 60 permanently deletes the data that is stored in the spare disk (at this time still the designated hard disk device) 20 (SP39), and thereafter ends the second encryption re-key processing.

(1-4-4) Encryption Key Exchange Process Control Processing

Figure 15:
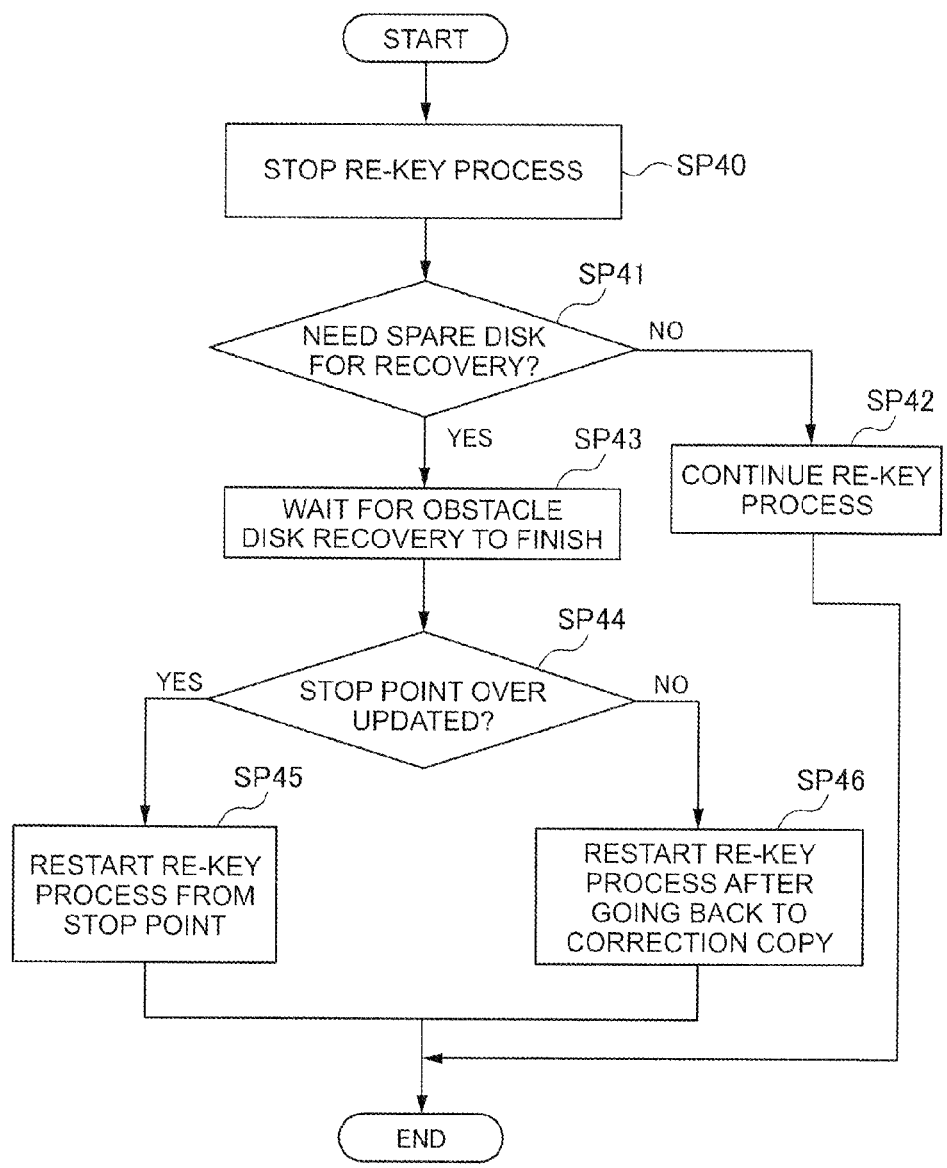
FIG. 15 is a flowchart showing a processing routine of encryption re-key process control processing.

Meanwhile, FIG. 15 shows a processing routine of the encryption re-key process control processing to be executed by the encryption re-key process control program 62 (FIG. 7) if a failure in any one of the hard disk devices 20 belonging to the storage device 3 is detected during the execution of the first encryption re-key processing or a failure in the designated hard disk device 20 is detected during the execution of the second encryption re-key processing.

If the encryption re-key process control program 62 detects some kind of failure in any one of the hard disk devices 20 belonging to designated parity group 22 or the designated hard disk device 20 while the encryption re-key control program 60 (FIG. 7) is executing the first or second encryption re-key processing, it starts the encryption re-key process control processing, and foremost issues a command to the encryption re-key control program 60 for temporarily discontinuing the first or second encryption re-key processing (SP40).

Subsequently, the encryption re-key process control program 62 determines whether the spare disk 20 is required for recovering from the foregoing failure (SP41).

In the foregoing case, for instance, if the failure is a minor failure such as a tolerable number of defective sectors arising in the hard disk device 20, it is possible to recover from the failure without having to use the spare disk 20 (SP41: NO). Consequently, in the foregoing case, the encryption re-key process control program 62 notifies the encryption re-key control program 60 to resume the encryption re-key processing (SP42), and thereafter ends the encryption re-key process control processing.

Meanwhile, for example, if the foregoing failure is a major failure such as the blockage of the hard disk device 20, it is necessary to use the spare disk 20 in order to recover from the failure (SP41: YES). Consequently, in the foregoing case, the encryption re-key process control program 62 releases the spare disk 20 that was being used in the first or second encryption re-key processing. The encryption re-key process control program 62 thereafter waits until the failed hard disk device 20 recovers from such failure by being replaced or the like and it enters a status where the spare disk 20 can be used for the first or second encryption re-key processing (SP43).

When it eventually becomes a status where the spare disk 20 can be used for the first or second encryption re-key processing, the encryption re-key process control program 62 determines whether the first or second encryption re-key processing had already proceeded to the stage of updating the disk management table 64 and the volume management table 65 (step SP9 of FIG. 12 or step SP38 of FIG. 14) at the time that the encryption re-key processing was discontinued at step SP40 (SP44).

To obtain a positive result in this determination means that the hard disk device 20 as the encryption re-key target and the spare disk 20 have already been swapped at the stage where the first or second encryption re-key processing was discontinued at step SP40, and that spare disk 20 was not used in the failure recovery processing that was subsequently performed.

Consequently, in the foregoing case, the encryption re-key process control program 62 notifies the encryption re-key control program 60 to resume, without change, the first or second encryption re-key processing that was discontinued at step SP40 (SP45), and thereafter ends the encryption re-key process control processing. Here, the encryption re-key control program 60 resumes the first or second encryption re-key processing according to the foregoing notification from the stage that such first or second encryption re-key processing was discontinued upon receiving the notification at step SP60.

Meanwhile, to obtain a negative result in the determination at step SP44 means that, after the first or second encryption re-key processing was discontinued at step SP40, the spare disk 20 was used in the failure recovery processing that was performed subsequently, and the data stored in that spare disk 20 may be different from the data that was subject to correction copy.

Consequently, in the foregoing case, the encryption re-key process control program 62 notifies the encryption re-key control program 60 to resume the encryption re-key processing to the hard disk device 20 that was the encryption re-key target at the time that the first or second encryption re-key processing was discontinued at step SP40 by returning to the beginning of the correction copy (step SP8 of FIG. 12 or step SP36 or step SP37 of FIG. 14) (SP46), and thereafter ends the encryption re-key process control processing. Here, the encryption re-key control program 60 resumes the first or second encryption re-key processing to that hard disk device 20 according the foregoing notification from the beginning of the correction copy.

(1-5) Effect of Present Embodiment

As described above, with the encryption re-key method according to the present embodiment, since the encryption re-key processing is performed using the correction copy function loaded in the storage device 3, there is no fear as to which encryption key should be applied to data stored in which storage area become unclear as in the case of adopting the foregoing overwrite method as the encryption re-key method, and it is not necessary to prepare the same number of hard disk devices 20 as the hard disk devices 20 configuring the parity group to be subject to the encryption re-key as in the case of adopting the foregoing migration method as the encryption re-key method. Consequently, according to the encryption re-key method of this embodiment, it is possible to perform encryption re-key processing with high reliability and with low cost.

(2) Second Embodiment

FIG. 1 shows the overall computer system 100 according to the second embodiment. This computer system 100 differs from the computer system 1 of the first embodiment with respect to the point that the hard disk devices 102 (FIG. 3) mounted on the storage device 101 are equipped with an encryption function.

Specifically, although the control unit 30 of the storage device 3 performed the reading and writing of the encrypted/decrypted data from and into the hard disk devices 20 in the first embodiment, in this embodiment, the control unit 103 (FIG. 3) of the storage device 101 sends the unencrypted data, together with the encryption key, to the hard disk devices 102.

The hard disk device 102 stores the data that was sent from the control unit 103 in a memory medium in that hard disk device 102 upon encrypting such data with the encryption key that was sent together with that data.

Moreover, if the hard disk device 102 subsequently receives a data read request from the control unit 103, it reads the corresponding data from the memory medium, and decrypts and sends that data to the control unit 103.

Figure 16:
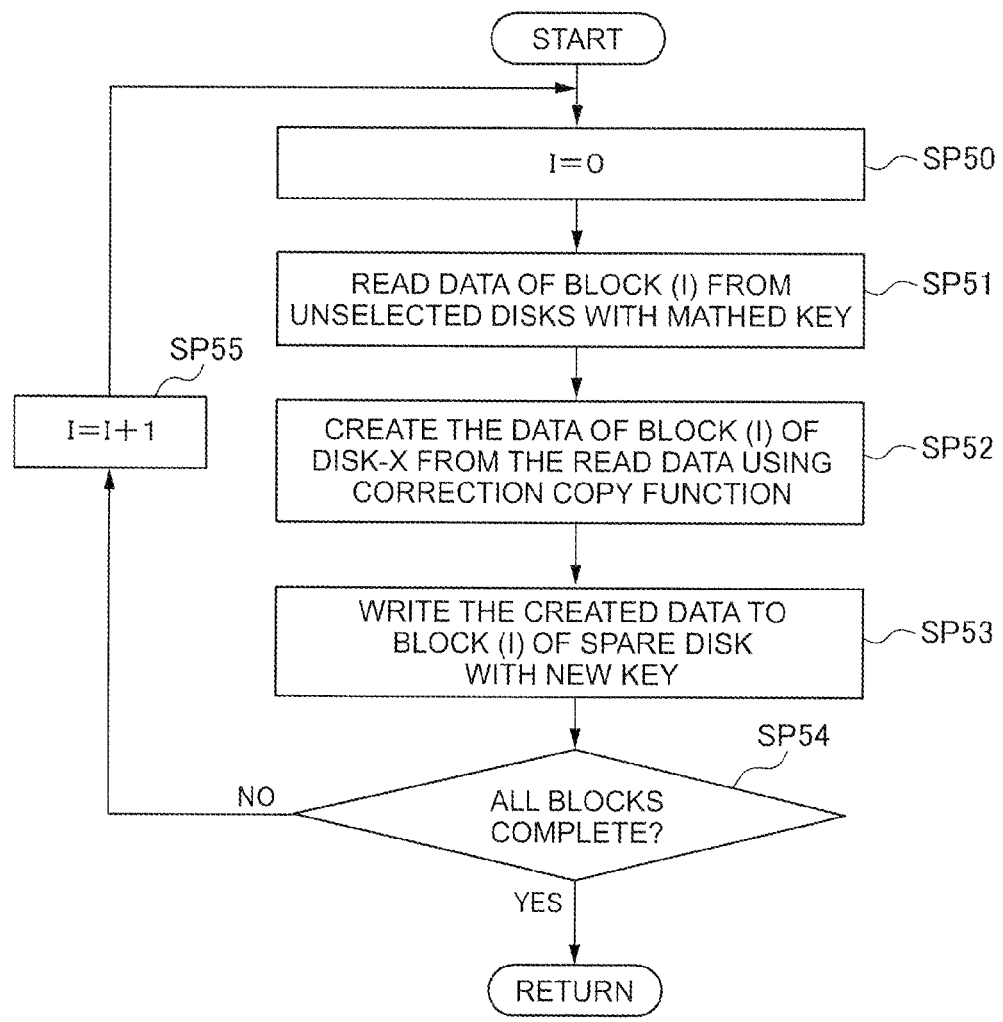
FIG. 16 is a flowchart showing a processing routine of correction copy processing according to the second embodiment.

FIG. 16 shows a processing routine of the correction copy processing according to the second embodiment to be executed by the encryption re-key control program 104 (FIG. 7) in the storage device 101.

The foregoing encryption re-key control program 104 performs the same processing as the first embodiment described with reference to FIG. 12 or FIG. 14 regarding the first and second encryption re-key processing, but executes the second correction copy processing shown in FIG. 16 regarding the correction copy processing.

Specifically, when the encryption re-key control program 104 proceeds to step SP8 (FIG. 12) of the first encryption re-key processing or step SP36 (FIG. 14) of the second encryption re-key processing, it starts the second correction copy processing, and foremost resets the count value of block counter described above (SP50).

Subsequently, the encryption re-key control program 104 respectively reads data that is stored in the logical block assigned with the same block number as the count value of the block counter from the respective hard disk devices 102 belonging to the designated parity group 22 other than the hard disk device 102 as the encryption re-key target (SP51). Incidentally, the data to be read from the respective hard disk devices 102 in the foregoing case have already been decrypted in the hard disk devices 102.

Subsequently, the encryption re-key control program 104 creates, using the correction copy function, the data that should probably be stored in the logical block assigned with the same block number as the count value of the block counter in the hard disk device 102 as the encryption re-key target based on the respective data that were acquired at step SP52 (SP23).

The encryption re-key control program 104 thereafter send the created data to the spare disk 102 together with the new encryption key that is designated in the encryption re-key command and the write request for writing the data into the logical block in which the block number in the spare disk 102 is "I" (SP25).

The encryption re-key control program 104 thereafter sends the restored data to the spare disk together with the write request designating the logical block in which the block number is "I" as the write destination and the new encryption key that is designated in the encryption re-key command (SP53). Consequently, this data is subsequently encrypted in the spare disk 20, and thereafter written into the logical block in which the block number is "I."

Subsequently, the encryption re-key control program 104 determines whether the execution of the same processing regarding all logical blocks in the target hard disk device 102 is complete (SP54).

If the encryption re-key control program 104 obtains a negative result in this determination, it returns to step SP50 and thereafter repeats the same processing.

When the encryption re-key control program 104 obtains a positive result at step SP54 as a result of eventually completing the same processing regarding all logical volumes in the target hard disk device 102 as the encryption re-key target, it ends the correction copy processing and returns to the foregoing encryption re-key processing.

As described above, even with the computer system 100 according to the present embodiment, since the encryption re-key processing is performed using the correction copy function of the storage device 101, as with the first embodiment, it is possible to perform encryption re-key processing with high reliability and with low cost.

(3) Third Embodiment

In the first and second embodiments described above, a case was explained where the encryption re-key setting screen 70 (FIG. 11) displayed on the management computer 4 was used for selecting the encryption re-key target and the new encryption key and thereafter clicking the execution button 74 (FIG. 11) of the encryption re-key setting screen 70 so as to cause the storage device 3 to execute the first or second encryption re-key processing.

Meanwhile, the computer system 110 (FIG. 1) according to this embodiment differs from the first and second computer systems 1, 100 with respect to the point that the foregoing first or second encryption re-key processing is scheduled and periodically executed.

FIG. 17 shows a schedule management screen 120 that can be displayed on the management computer 111 by the user booting the encryption management program 112 of the management computer 111 (FIG. 4) and performing prescribed operations. The schedule management screen 120 is a screen for scheduling the intended encryption re-key processing as described above, and is configured from a task setting area 121, a resource selection area 122, an exchange key selection area 123 and a schedule display area 124.

Among the above, the schedule display area 124 displays, in list format, the schedule of the tasks that have been previously set.

The task setting area 121 is a GUI area for setting the start date of the task to be newly set and the execution cycle of such task. By inputting the start date of the task in the task start date designation column 130 of the task setting area 121, the start date of such task can be designated. Moreover, by clicking a pull-down button 132 of the frequency display column 131 in the task setting area 121, a pull-down menu listing predetermined frequencies (yearly, monthly, weekly or daily) is displayed and, by selecting one intended frequency from the pull-down menu, that frequency can be displayed in the frequency display column 131. The frequency that is displayed in the frequency display column 131 at such time will be designated as the frequency of executing that task.

The configuration and function of the resource selection area 122 and the exchange key selection area 123 are the same as the resource selection area 72 and the exchange key selection area 73 of the encryption re-key setting screen 70 described above with reference to FIG. 11, and the user is able to select the encryption re-key target and the new encryption key in the resource selection area 122 and the exchange key selection area 123.

After making the necessary designations and selections in the task setting area 121, the resource selection area 122 and the exchange key selection area 123 of the schedule management screen 120, the newly created schedule can be registered by clicking the execution button 133 at the lower right corner of the screen.

After the foregoing schedule is registered, the contents of the schedule that was set by the user with the schedule management screen 120 are subsequently managed by the management computer 111. Further, as a result of the encryption re-key command being sent from the management computer 111 to the storage device 3 according to the foregoing schedule, the registered schedule is thereby executed by the storage device 3.

Incidentally, if the cancel button 134 is clicked in the schedule management screen 120, all user operations that were performed at such time will be cancelled.

Moreover, the table of the schedule display area 124 in the schedule management screen 120 is equipped with a line selection function by way of being clicked, and the selected task can be deleted by clicking the DELETE button.

As described above, according to the present embodiment, so as long as the encryption re-key processing according to the first or second embodiment is once set, the encryption re-key processing according to the first or second embodiment will be periodically performed according to the foregoing setting, and it will be possible to omit the setting procedures for the second setting onward.

In addition, since the encryption re-key processing according to the first or second embodiment will be performed periodically, it is possible to increase the security in comparison to the first or second embodiment, and the reliability of the storage device 3, 101 can thereby be improved even further.

(4) Other Embodiments

In the first to third embodiments described above, although a case was explained for applying the present invention to the computer systems 1, 100, 110 configured as shown in FIG. 1 to FIG. 4, the present invention is not limited thereto, and may also be broadly applied to computer systems of various other configurations.

Moreover, in the first to third embodiments described above, although a case was explained where the hard disk devices 20, 102 were adopted as the memory mediums for storing data in the storage devices 3, 101, the present invention is not limited thereto, and the present invention may also be applied to cases where semiconductor memories or optical disks are adopted as the foregoing memory mediums.

Furthermore, in the first to third embodiments described above, although a case was explained where the function of restoring the partitioned data or the parity stored in a memory medium to be subject to encryption re-key based on decrypted data of the partitioned data or the parity stored in each memory medium other than the memory medium to be subject to encryption re-key among the plurality of memory mediums (hard disk devices 20, 102), the function of storing the restored partitioned data or the parity in a backup memory medium while encrypting the restored partitioned data or the parity with a new encryption key, and the function of interchanging the backup memory medium and the memory medium to be subject to encryption re-key so that the backup memory medium will be a memory medium configuring the parity group 22 and the memory medium to be subject to encryption re-key will be the backup memory medium were loaded onto one micro processor 41, the present invention is not limited thereto, and, for example, a part of the foregoing functions may be distributed by being performed by hardware.

INDUSTRIAL APPLICABILITY

The present invention can be applied to storage devices that encrypt and store data in a memory medium.

What is claimed is:

1. A storage device coupled to one or more external devices, the storage device comprising:
   a plurality of memory mediums including a backup memory medium; and
   a control unit,
   wherein the control unit encrypts data supplied from any of the one or more external devices by using a first encryption key and stores the encrypted data in a memory medium of the plurality of memory mediums, the control unit comprising:
   a determination unit configured to make a determination of whether or not the backup memory medium is usable or not, in accordance with an encryption key exchange command from any of the one or more external devices;
   a selection unit configured to select a first memory medium to be an encryption key exchange target, from among the plurality of memory mediums other than the backup memory medium;
   a decryption unit configured to decrypt data stored in the first storage medium by using the first encryption key;
   a storage unit configured to encrypt the decrypted data with a second encryption key designated by the encryption key exchange command and to store the encrypted data in the backup memory medium;
   a memory medium swan unit configured to set the selected first storage medium as a new backup storage medium for use in execution of an encryption key exchange,
   wherein the determination unit makes a determination as to whether or not the new backup storage medium is usable, and if the determination unit determines that the new backup storage medium is not usable, the determination unit repeats the determination of whether or not the new backup memory medium is usable, and
   wherein if the determination unit fails to determine that the new backup memory medium is usable, the determination unit notifies the external device of the one or more external devices, which issued the encryption key exchange command, that the encryption key exchange cannot be performed; and
   a shredding unit,
   wherein if the determination unit determines that the new backup storage medium is usable, the shredding unit permanently deletes the data that is stored in the new backup memory medium,
   wherein if a failure is detected in any one of the plurality of memory mediums belonging to a designated parity group of a plurality of parity groups or a designated memory medium of the plurality of memory mediums during the execution of the encryption key exchange, a command is issued to temporarily discontinue the execution of the encryption key exchange,
   wherein the control unit makes a determination of whether the new backup memory medium is required for recovering from the failure, the determination of whether the new backup memory medium is required being based on a type of failure, and
   wherein if it is determined that the new backup memory medium is not required for recovering from the failure, a command is issued to resume the execution of the encryption key exchange.

2. The storage device according to claim 1,
   wherein if it is determined that the new backup memory medium is required for recovering from the failure, the control unit releases the new backup memory from use in the execution of the encryption key exchange, waits until the one of the plurality of memory devices recovers from the failure, and then a command is issued to resume the execution of the encryption key exchange, and
   wherein after the command is issued to resume the execution of the encryption exchange, a status is entered where use of the new backup memory medium for the execution of the encryption key exchange can be resumed.

3. The storage device according to claim 2,
   wherein the control unit determines whether the encryption key exchange had proceeded to a state of updating management information at the time when the execution of the encryption key exchange was temporarily discontinued, and
   wherein if it is determined that the encryption key exchange did proceed to the state of updating the management information at the time when the execution of the encryption key exchange was temporarily discontinued, a command is issued to restart, without change, the execution of the encryption key exchange from the time when the execution of the encryption key exchange was temporarily discontinued.

4. The storage device according to claim 3,
   wherein if it is determined that the encryption key exchange did not proceed to the state of updating the management information at the time when the execution of the encryption key exchange was temporarily discontinued, the execution of the encryption key exchange is restarted from the beginning of execution of correction copy, and
   wherein the execution of correction copy includes correcting data and copying the corrected data to the new backup memory medium.

5. The storage device according to claim 4,
   wherein if the determination unit determines that the new backup storage medium is usable, the determination unit determines whether the new backup storage medium belongs to a parity group of the plurality of parity groups, and
   wherein if the determination determine that the new backup storage medium belongs to the parity group, the correction copy is executed.

6. A control method for a storage device coupled to one or more external devices, the storage device comprising a plurality of memory mediums including a backup memory medium and a control unit, the method comprising:
   encrypting, by the control unit, data supplied from any of the one or more external devices by using a first encryption key and stores the encrypted data in a memory medium of the plurality of memory mediums;

making a determination of whether or not the backup memory medium is usable or not, in accordance with an encryption key exchange command from any of the one or more external devices;

selecting a first memory medium to be an encryption key exchange target, from among the plurality of memory mediums other than the backup memory medium;

decrypting data stored in the first storage medium by using the first encryption key;

encrypting the decrypted data with a second encryption key designated by the encryption key exchange command and storing the encrypted data in the backup memory medium;

setting the selected first storage medium as a new backup storage medium for use in execution of an encryption key exchange;

determining whether or not the new backup storage medium is usable, and if determined that the new backup storage medium is not usable, repeating the step of determining whether or not the new backup memory medium is usable;

notifying the external device of the one or more external devices, which issued the encryption key exchange command, that the encryption key exchange cannot be performed, if repeating the step of determining results in a failure to determine that the new backup memory medium is usable;

if determined that the new backup storage medium is usable, permanently deleting the data that is stored in the new backup memory medium;

if a failure is detected in any one of the plurality of memory mediums belonging to a designated parity group of a plurality of parity groups or a designated memory medium of the plurality of memory mediums during the execution of the encryption key exchange, issuing a command to temporarily discontinue the execution of the encryption key exchange;

making a determination of whether the new backup memory medium is required for recovering from the failure, the determination of whether the new backup memory medium is required being based on a type of failure; and if it is determined that the new backup memory medium is not required for recovering from the failure, issuing a command to resume the execution of the encryption key exchange.

7. The control method according to claim 6, further comprising:

if it is determined that the new backup memory medium is required for recovering from the failure, releasing the new backup memory from use in the execution of the encryption key exchange, waiting until the one of the plurality of memory devices recovers from the failure, and then issuing a command to resume the execution of the encryption key exchange; and after the command is issued to resume the execution of the encryption exchange, entering a status where use of the new backup memory medium for the execution of the encryption key exchange can be resumed.

8. The control method according to claim 7, further comprising:

determining whether the encryption key exchange had proceeded to a state of updating management information at the time when the execution of the encryption key exchange was temporarily discontinued; and if it is determined that the encryption key exchange did proceed to the state of updating the management information at the time when the execution of the encryption key exchange was temporarily discontinued, issuing a command to restart, without change, the execution of the encryption key exchange from the time when the execution of the encryption key exchange was temporarily discontinued.

9. The control method according to claim 8, further comprising:

if it is determined that the encryption key exchange did not proceed to the state of updating the management information at the time when the execution of the encryption key exchange was temporarily discontinued, restarting the execution of the encryption key exchange from the beginning of execution of correction copy, wherein the execution of correction copy includes correcting data and copying the corrected data to the new backup memory medium.

10. The control method according to claim 9, further comprising:

if the determination unit determines that the new backup storage medium is usable, determining whether the new backup storage medium belongs to a parity group of the plurality of parity groups; and executing the correction copy, if determined that the new backup storage medium belongs to the parity group.

* * * * *